United States Patent [19]
Kawashima

[11] Patent Number: 5,872,593
[45] Date of Patent: Feb. 16, 1999

[54] APPARATUS AND METHOD FOR CALIBRATING VIDEO DISPLAYS ABOUT POINTS WITHIN THE VIEWABLE AREA

[75] Inventor: Toshiyuki Kawashima, N. Huntingdon, Pa.

[73] Assignees: Sony Corporation, Tokyo, Japan; Sony Electronics Inc., Park Ridge, N.J.

[21] Appl. No.: 868,571

[22] Filed: Jun. 4, 1997

[51] Int. Cl.[6] .................................................. H04N 17/00
[52] U.S. Cl. .......................... 348/181; 348/180; 348/745; 348/806; 348/807
[58] Field of Search .................................... 348/807, 181, 348/177, 747, 745, 746, 806, 180

[56] References Cited

U.S. PATENT DOCUMENTS

| | | | |
|---|---|---|---|
| 4,897,721 | 1/1990 | Young et al. ............................. | 358/139 |
| 4,999,703 | 3/1991 | Henderson ................................ | 358/60 |
| 5,235,173 | 8/1993 | Gleim et al. .......................... | 250/206.1 |
| 5,237,246 | 8/1993 | Gleim et al. ............................. | 348/745 |
| 5,526,043 | 6/1996 | Wen ......................................... | 348/190 |
| 5,550,598 | 8/1996 | Itoh et al. ................................ | 348/807 |
| 5,576,774 | 11/1996 | Hosoi et al. ............................ | 348/745 |

*Primary Examiner*—John K. Peng
*Assistant Examiner*—Jean W. Désir
*Attorney, Agent, or Firm*—Frommer Lawrence & Haug, LLP; William S. Frommer

[57] ABSTRACT

The invention provides an external sensor that is employed by the user of a video display when performing convergence calibrations at various points within the display's viewable area. The external sensor is placed on the screen by the user while a convergence procedure is undertaken by the video display. Readings taken by the sensor during the procedure are relayed to the display's convergence algorithm(s) by means of a suitable coupling, thereby allowing for convergence calculations about the user selected point. When convergence about the point has been achieved, the user may move the sensor to a new point on the screen to initiate convergence procedures about the new point, or remove the sensor from the screen to facilitate viewing.

4 Claims, 11 Drawing Sheets

NO PATTERN

NO PATTERN

APPARATUS AND METHOD FOR CALIBRATING VIDEO DISPLAYS ABOUT POINTS WITHIN THE VIEWABLE AREA

FIELD OF THE INVENTION

This invention relates to video displays, and more particularly to performing convergence calibration in video displays.

BACKGROUND OF THE INVENTION

It is well known in the field of video displays to generate pictures on a screen by combining multiple beams of light. For example, a typical rear projection color television set includes three cathode ray tubes (CRTs), each CRT processing one of the primary colors —red, blue or green. By combining the three monochromatic beams the set can produce full color television pictures. However, in order for the set produce accurate pictures, proper alignment of the beams must be maintained. That is, the CRTs must be calibrated so that their beams are focused at the same point on the screen. Accordingly, the calibration of the CRTs is often referred to as a convergence procedure, and beam alignment is often referred to as convergence. For a more detailed discussion of convergence, references are made to FIGS. 1 and 2.

Figure 1:
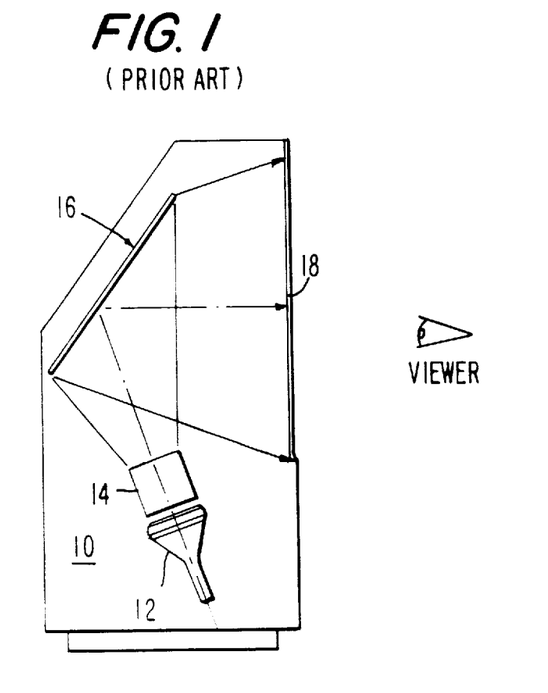
FIG. 1 is a plan view of a typical rear projection television set.

FIG. 1 is a plan view of a model rear projection television set. The components of the set are housed within a cabinet 10, and they include: a CRT 12, a lens 14, a mirror 16, and a screen 18. The model set includes three CRTs and multiple lenses for each CRT, although for clarity, only a single CRT and a single lens are shown in the figure. The light from the CRT passes through the lens and illuminates the mirror which, in turn, reflects the light onto the screen for observation by the viewer.

Figure 2:
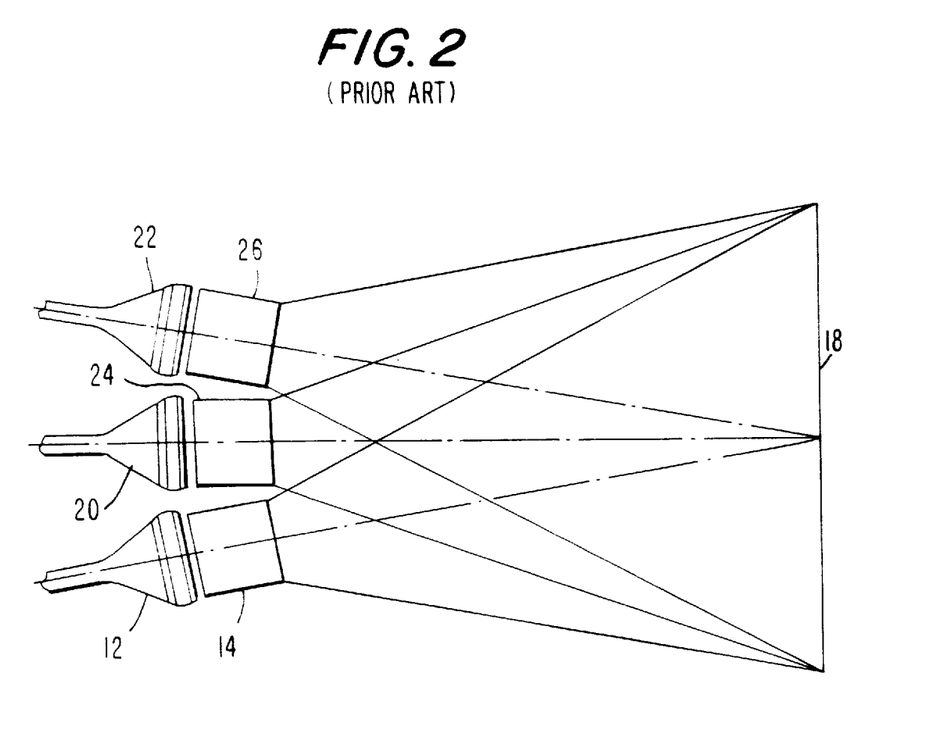
FIG. 2 illustrates the relationship between the three CRTs of the FIG. 1 set.

FIG. 2 illustrates the relationship between the three CRTs of the model set. As can be seen from the figure, CRTs 12, 20 and 22 are matched respectively with lenses 14, 24 and 26, and the CRTs are aligned so that their beams converge. To maintain the alignment of the beams one or more photosensors are typically provided at the periphery of the screen. An example is shown in FIG. 3.

Figure 3:
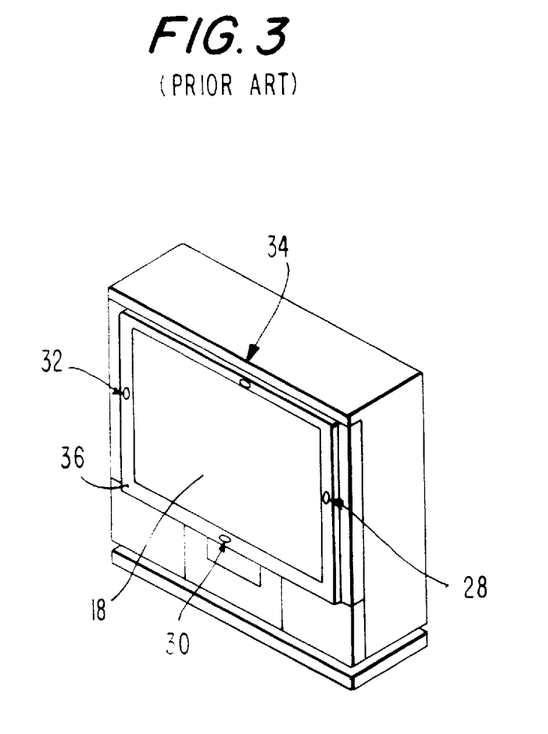
FIG. 3 shows how photosensors are typically arranged around a screen for the purpose of maintaining beam convergence.

FIG. 3 includes an arrangement of four photosensors, 28, 30, 32 and 34. The sensors are located inside the cabinet and are not visible to the viewer. Also, the sensors are located behind a screen frame 36, which is not part of the display screen, and therefore the sensors do not interfere with images displayed on the screen. Nevertheless, the sensors are located within the area that can be scanned by the CRTs.

Figure 4A:
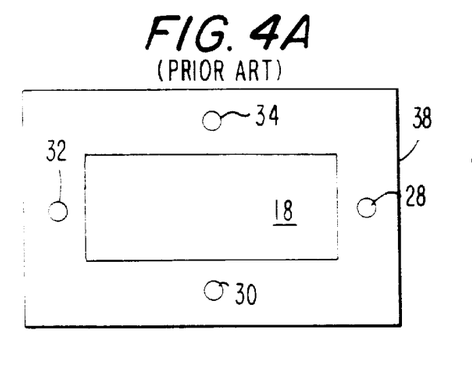
FIG. 4A shows the typical relationship between a plurality of convergence sensors, a display screen, and a CRT scannable area.

FIG. 4A shows the relationship between sensors 28–34, screen 18, and a CRT scannable area 38 as seen from the viewer's perspective. For clarity the screen frame is not shown. When performing the convergence procedure, test patterns are produced within the scannable area and detected by the sensors. More specifically, each CRT produces two test patterns, a wide pattern and a narrow pattern. Thus, to complete the convergence procedure the following patterns are produced: red-wide, red-narrow, blue-wide, blue-narrow, green-wide, and green-narrow. These patterns and their function are discussed in more detail in connection with FIGS. 4B–4E.

FIGS. 4B–4E show illustrative test patterns as generated by any one of the primary color CRTs. In the interest of brevity, FIGS. 4B–4E are discussed in the context of the red CRT only. However, it should be noted that the discussion is equally applicable to the other primary color CRTs.

Figure 4B:
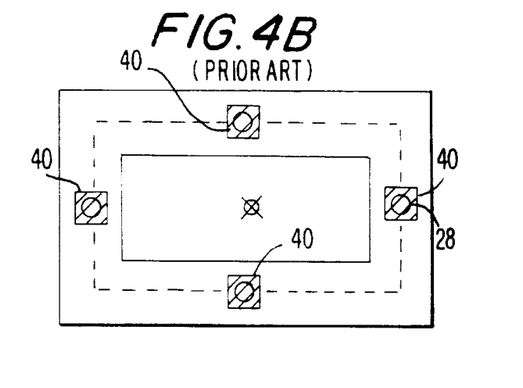
FIGS. 4B–4E show the typical relationship between the sensors, the display screen, the scannable area, and several test patterns.
Figure 4C:
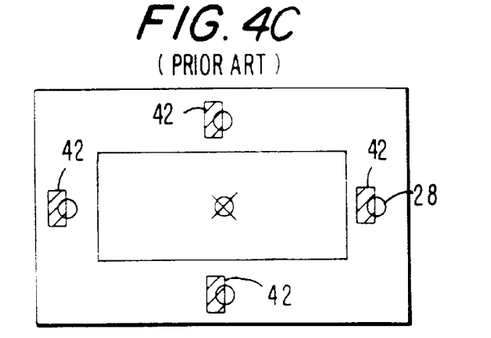

FIGS. 4B and 4C show test patterns that are generated when the red CRT is properly aligned with the center of the screen. FIG. 4B shows a red-wide pattern 40 and its relative position to the scannable area, screen, and sensors. As can be seen from the figure, the red-wide pattern is made up of four illuminated areas that define a rectangle (indicated by the dotted line). Each illuminated area overlaps the entirety of one sensor. The center point of the scannable area is denoted by "o" and the center of the rectangle defined by the red-wide pattern is denoted by "x". Since the red CRT is properly aligned, the o and x coincide.

FIG. 4C shows a red-narrow pattern 42. As in the case of the wide pattern, since the CRT is properly aligned, the x and o coincide. However, in the case of the narrow pattern, only one half of each of the sensors are overlapped by the pattern. The relative sensor overlap in the wide pattern and narrow pattern cases is key to maintaining alignment of the CRT, and will be discussed in more detail below. First, FIGS. 4D and 4E are referred to in order to show the effect of misalignment on the test patterns.

Figure 4D:
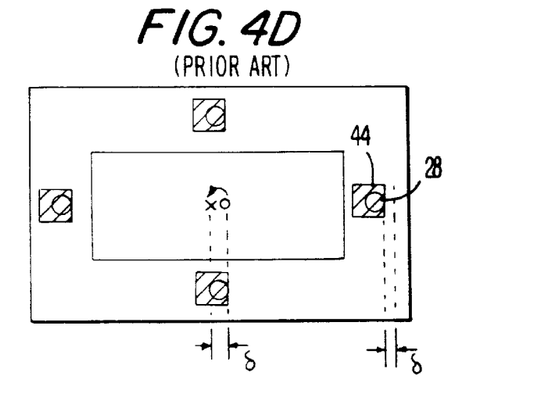
Figure 4E:
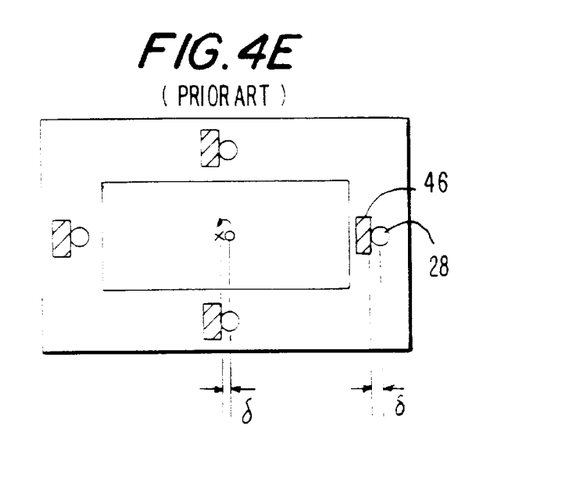

FIG. 4D shows a red-wide pattern 44 that is generated when the red CRT is misaligned by an amount δ in the horizontal direction (left of center from the viewer's perspective). Since the pattern is sufficiently wide, it still overlaps the entirety of each of the sensors. FIG. 4E shows red-narrow pattern 46 that is generated when the red CRT is misaligned by an amount δ in the horizontal direction (left of center from the viewer's perspective). In FIG. 4E, since the pattern is narrow, the sensor overlap is changed relative to the overlap shown in FIG. 4C. As will be described below, this change in overlap is used to determine the amount of misalignment, which is, in turn, used as an error signal for the purpose of correcting the misalignment.

The amount of beam misalignment at a position defined by a given sensor is determined by observing that sensor's readings when exposed to the wide and narrow patterns. The observed readings are used to form a ratio which is then compared to a desired ratio, the desired ratio being the ratio obtained for the sensor under no misalignment conditions. The difference between the measured ratio and the desired ratio indicates the amount of beam misalignment. Described below is an illustrative misalignment determination as performed by sensor 28.

Figure 5A:
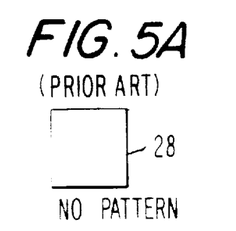
FIG. 5A is a representation of an unilluminated sensor.
Figure 5B:
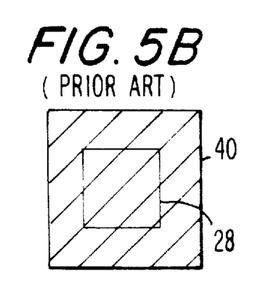
FIGS. 5B–5E are representations of the sensor of FIG. 5A as illuminated by the test patterns of FIGS. 4B–4E, respectively.
Figure 5C:
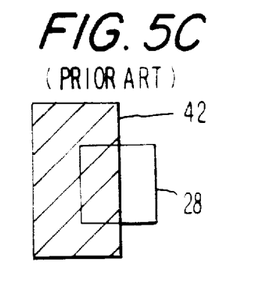
Figure 5D:
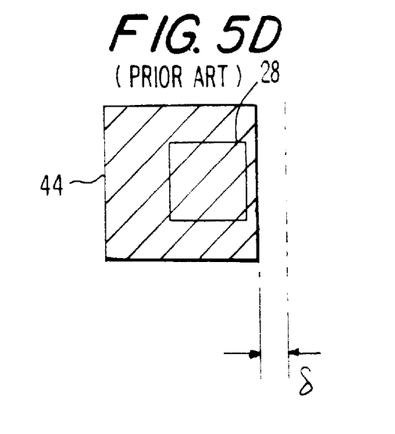
Figure 5E:
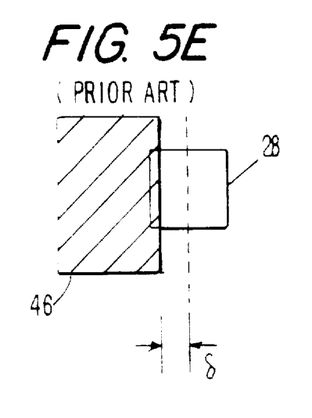

FIGS. 5A–5E show the relationship between sensor 28 and various test patterns. FIG. 5A depicts the sensor in a no pattern condition. FIGS. 5B–5E show the sensor as illuminated by the patterns of FIGS. 4B–4E, respectively. To measure the misalignment, the light incident on sensor 28 is measured for each of the wide and narrow cases and a ratio of the two is computed. The value of the ratio in the no misalignment case is the desired ratio, and it is obtained in the following manner: the sensor reading under no pattern conditions (noise) is subtracted from the sensor reading under wide-pattern/no-misalignment conditions (FIG. 5B) to generate a first difference; the sensor reading under no pattern conditions is subtracted from the sensor reading under narrow-pattern/no-misalignment conditions (FIG. 5C) to generate a second difference; and the second difference is divided by the first difference. To obtain the value of the ratio for the depicted misalignment: the sensor reading under no pattern conditions (noise) is subtracted from the sensor reading under wide-pattern/δ-misalignment conditions (FIG. 5D) to generate a first difference; the sensor reading under no pattern conditions is subtracted from the sensor reading under narrow-pattern/δ-misalignment conditions (FIG. 5E) to generate a second difference; and the second difference is divided by the first difference. The difference between the two ratios thus obtained indicates the amount of misalignment. The red CRT is then adjusted until the ratios match. A similar procedure is executed for the other primary beams and in this way convergence is achieved.

OBJECTS AND SUMMARY OF THE INVENTION

It has been recognized that the beam convergence achieved by prior methods is limited by the existing sensor logistics. More specifically, the prior methods of convergence rely on sensors located at the periphery of the screen, and therefore perform convergence about the sensors positions at the periphery, without regard for convergence at positions toward the center of the screen. That is, the sensors may indicate that the beams are properly converged while in fact the beams are only converging at the periphery. In this manner, misalignment of the beams at points toward the center of the display remain uncorrected.

It has been further recognized that the placement of one or more fixed sensors within the viewable area of a display screen would interfere with the display of images, and that putting a moveable sensor within the display cabinet would significantly increase the cost and complexity of the convergence system.

Accordingly, it is an object of the present invention to provide a convergence apparatus and a convergence procedure that will allow for beam convergence to be performed about multiple positions on a video display screen, including the periphery of the display, the center of the display, and positions between the periphery and the center.

It is a further object of the invention to provide a convergence apparatus and a convergence procedure that will allow for beam convergence to be performed about positions within the viewable area of the display screen without placing any sensors inside the display cabinet and without placing any sensors permanently within the viewable area of the screen.

The invention provides an external sensor that is employed by the user of a video display when performing convergence calibrations at various points within the display's viewable area. The external sensor is placed on the screen by the user while a convergence procedure is undertaken by the video display. Readings taken by the sensor during the procedure are relayed to the display's convergence algorithm(s) by means of a suitable coupling, thereby allowing for convergence calculations about the user selected point. When convergence about the point has been achieved, the user may move the sensor to a new point on the screen to initiate convergence procedures about the new point, or remove the sensor from the screen to facilitate viewing.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 6:
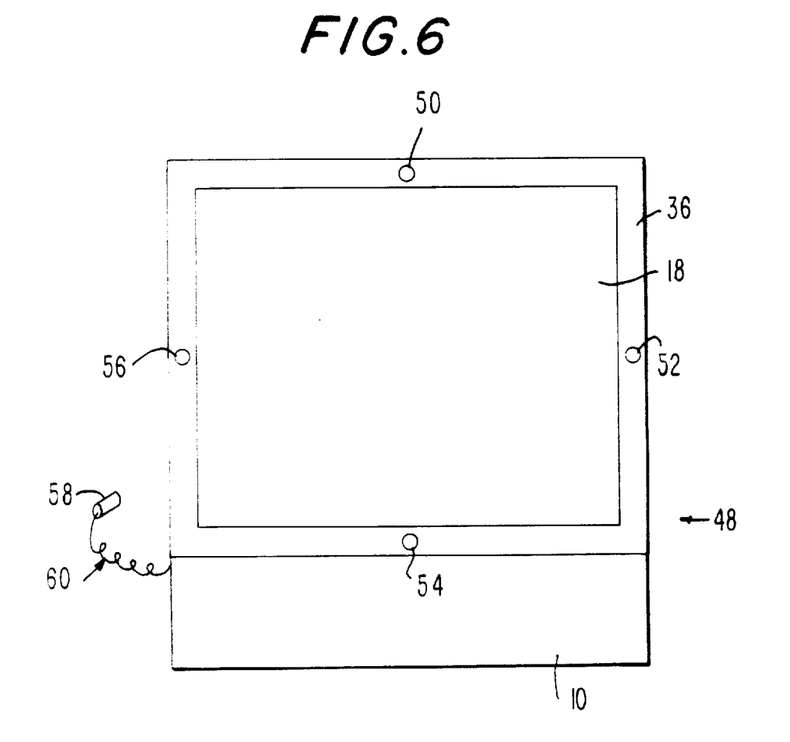
FIG. 6 shows a television set equipped with an external sensor in accordance with the invention.

FIG. 6 shows a television set 48 which is used to illustrate the principles of the invention. The set is equipped with an external sensor 58 and is housed in a cabinet 10. Located within the cabinet are the following components: a screen viewable area 18, a screen frame 36, and four periphery photo sensors, 50, 52, 54 and 56, located behind the frame. Notably, the external sensor is located outside the cabinet. The external sensor is coupled to the internal set components (to be described below) through a coupling 60. Coupling 60 may take many forms, such as a conventional insulated wire, a twisted shielded pair wire, a coaxial cable, a fiber optic line, a wireless link, and the like.

Figure 7:
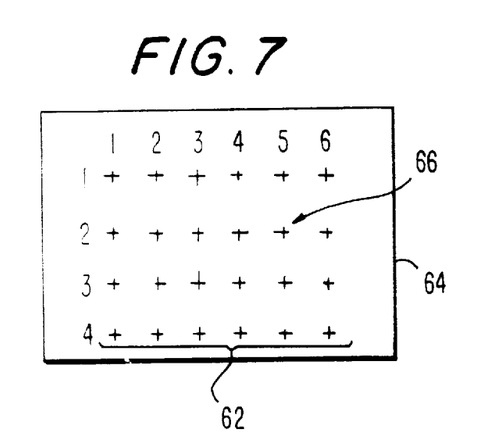
FIG. 7. shows a grid of selectable sensor positions according to the invention.

The periphery sensors of FIG. 6 are used to perform convergence testing at their respective positions at the screen edge, while the external sensor is used to perform convergence testing about points within the screen viewable area. Convergence testing at the peripheral sensors may be undertaken using test patterns similar to those described in connection with FIGS. 4A–4E and Figs. 5A–5E; or alternatively, using test patterns similar to those described in connection with the invention of co-pending, commonly assigned, U.S. patent application Ser. No.:08/869,126 (Attorney Docket No.: 450103-3882) — entitled "Apparatus and Method for Calibrating Video Displays" — which application is incorporated herein by reference. Likewise, convergence testing with the external sensor may be undertaken using test patterns similar to those described in connection with FIGS. 4A–4E and FIGS. 5A–5E; or alternatively, using test patterns similar to those described in connection with the invention of co-pending, commonly assigned, U.S. patent application Ser. No.: (Attorney Docket No.: 450103-3882). In the case of the peripheral sensors, the sensors are positioned at the time of construction of the set, and thus their positions are "known" by the television system, thereby providing a fixed reference point for purposes of determining where to generate the required peripheral test patterns. However, the external sensor may be positioned anywhere within the viewable area, and therefore its position must be determined prior to generating any non-peripheral test patterns. One way to determine the external sensor's position during convergence testing is to provide the user with a position grid. An example of such a grid is shown in FIG. 7. The grid includes a plurality of selectable sensor positions 62, as indicated by the "+" grid marks (the rows of "+"s are marked 1–4, the columns are marked 1–6). These grid marks may be placed on a screen overlay 64, as shown in the figure, in which case the overlay is placed over the screen during convergence procedures and removed during normal viewing. Alternatively, the grid marks may be placed directly on the screen in such a manner as not to interfere with images displayed on the screen, in which case there is no need for an overlay. In either case, the grid marks indicate positions where the external sensor may be placed and about which convergence testing may be performed.

Since the possible external sensor positions are predetermined, they provide fixed reference points for the purpose of generating convergence test patterns.

To illustrate convergence testing using the grid, a grid point 66 is considered. When the user wishes to perform a convergence test around point 66, the user places the movable sensor over point 66. The placement may be done visually, or with the aid of mechanical guides such as shallow slots etched into the screen. To alert the system to the position of the sensor the user may, for example, enter a grid point identifier into a system keypad, such as "2,5" (row, column) to indicate point 66. Now, with knowledge of the sensor's position, the system may generate suitable test patterns for setting the beam convergence about point 66.

Exemplary test patterns that may be used to perform convergence about point 66 are shown in FIGS. 8A–8D. The test patterns shown are similar to the test patterns disclosed in co-pending, commonly assigned, U.S. patent application Ser. No.: 08/869,126 (Attorney Docket No.: 450103-3882). For purposes of showing the relative positioning of the test patterns, each of FIGS. 8A–8D includes the screen viewable area 18 and the sensor 58 as positioned at point 66. Also, in each figure, an "o" indicates the center of the screen and an "x" tracks the movement of the test patterns. It should be noted that although the patterns depicted in the figures are generated by one of the system's CRTs, all of the system's CRTs are capable of generating such patterns and the discussion concerning the patterns applies to all the CRTs in the system.

Figure 8A:
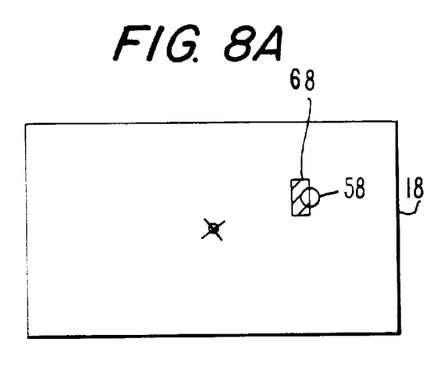
FIGS. 8A–8D show exemplary test patterns that may be used to perform convergence calibration about position (2,5) in the grid of FIG. 7.
Figure 8B:
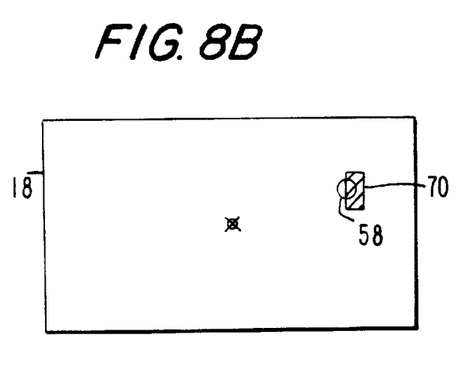

FIGS. 8A and 8B show the test patterns generated by the one of the CRTs when the CRT is properly aligned. FIG. 8A shows a first test pattern 68 which overlaps a left side portion (from the viewer's perspective) of the sensor, and FIG. 8B shows a second test pattern 70 which overlaps a right side portion of the sensor. FIGS. 8A and 8B represent the case of proper beam alignment, and this is indicated by positioning the "x" such that the "o" and "x" coincide.

Figure 8C:
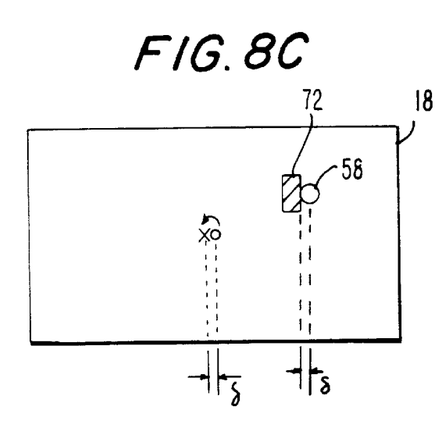
Figure 8D:
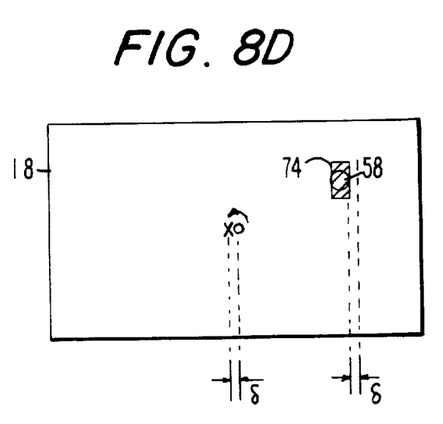

FIGS. 8C and 8D show a shifted first test pattern 72 and a shifted second test pattern 74, respectively. The shifted first pattern is the pattern that results when the CRT is misaligned and attempts to generate the first pattern. The shifted second pattern is the pattern that results when the CRT is misaligned and attempts to generate the second pattern. In both shifted pattern cases, the CRT is misaligned by an amount δ in the horizontal direction (left of center from the viewer's perspective). As can be seen from the figures, the effect of the misalignment on the first pattern is to shift the pattern so that its overlap with the sensor is reduced. Whereas the effect of the misalignment on the second pattern is to shift the pattern so that its overlap with the sensor is increased. As will be described below, the first and second pattern overlap changes resulting from a misalignment are used to determine the amount of the misalignment. The amount of misalignment is, in turn, used as an error signal for the purpose of correcting the misalignment.

The amount of misalignment is determined by observing the sensor readings as the sensor is exposed to the first and second patterns. The readings obtained are used to form a measured ratio that is compared to a desired ratio, the desired ratio being the ratio obtained for the sensor under no misalignment conditions. The difference between the measured ratio and the desired ratio indicates the amount of beam misalignment at the sensor's location. What follows is a description of an illustrative misalignment determination as performed on the basis of readings taken through sensor 58 while positioned at grid point 66.

Figure 9A:
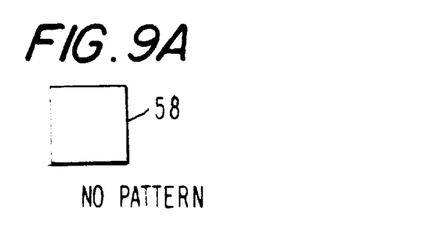
FIG. 9A is a representation of the movable sensor as placed at position (2,5) on the grid of FIG. 7 and unilluminated.
Figure 9B:
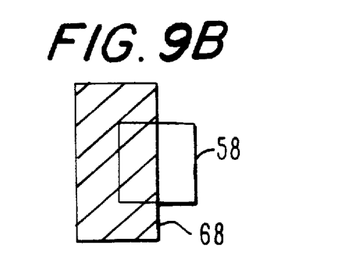
FIGS. 9B–9E are representations of the sensor of FIG. 9A as illuminated by the test patterns of FIGS. 8A–8D, respectively.
Figure 9C:
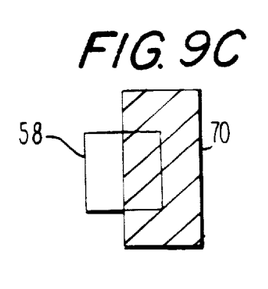
Figure 9D:
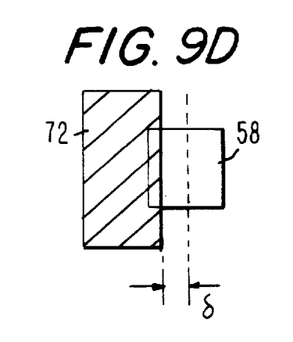
Figure 9E:
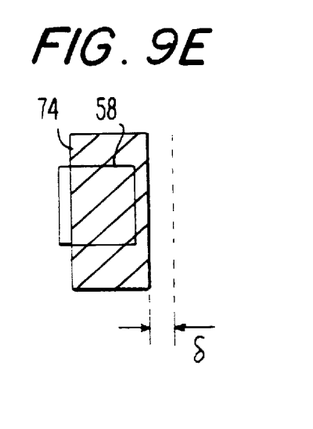

FIGS. 9A–9E show the relationship between the external sensor and various test patterns. FIG. 9A depicts the sensor in a no pattern condition. FIGS. 9B–9E show the sensor as illuminated by the patterns of FIGS. 8A–8D, respectively. To measure the misalignment, the light incident on the sensor during illumination by the first pattern is measured and the light incident on the sensor during illumination by the second pattern is measured. A ratio of the two measurements is computed. The value of the ratio in the no misalignment case is the desired ratio, and it is a design parameter for the television set. To obtain the value of the desired ratio: the sensor reading under no pattern conditions (noise) is subtracted from the sensor reading under first-pattern/no-misalignment conditions (FIG. 9B) to generate a first difference; the sensor reading under no pattern conditions is subtracted from the sensor reading under second-pattern/no-misalignment conditions (FIG. 9C) to generate a second difference; the first difference is added to the second difference to form a sum; and the first difference is divided by the sum. To obtain the value of the ratio for the depicted misalignment: the sensor reading under no pattern conditions (noise) is subtracted from the sensor reading under first-pattern/δ-misalignment conditions (FIG. 9D) to generate a first difference; the sensor reading under no pattern conditions is subtracted from the sensor reading under second-pattern/δ-misalignment conditions (FIG. 9E) to generate a second difference; the first difference is added to the second difference to form a sum; and the first difference is divided by the sum. The difference between the two ratios thus obtained indicates the amount of misalignment. The CRT is then adjusted until the ratios match. A similar procedure is executed for the other primary beams and in this manner convergence about grid position 66 is achieved.

Figure 10:
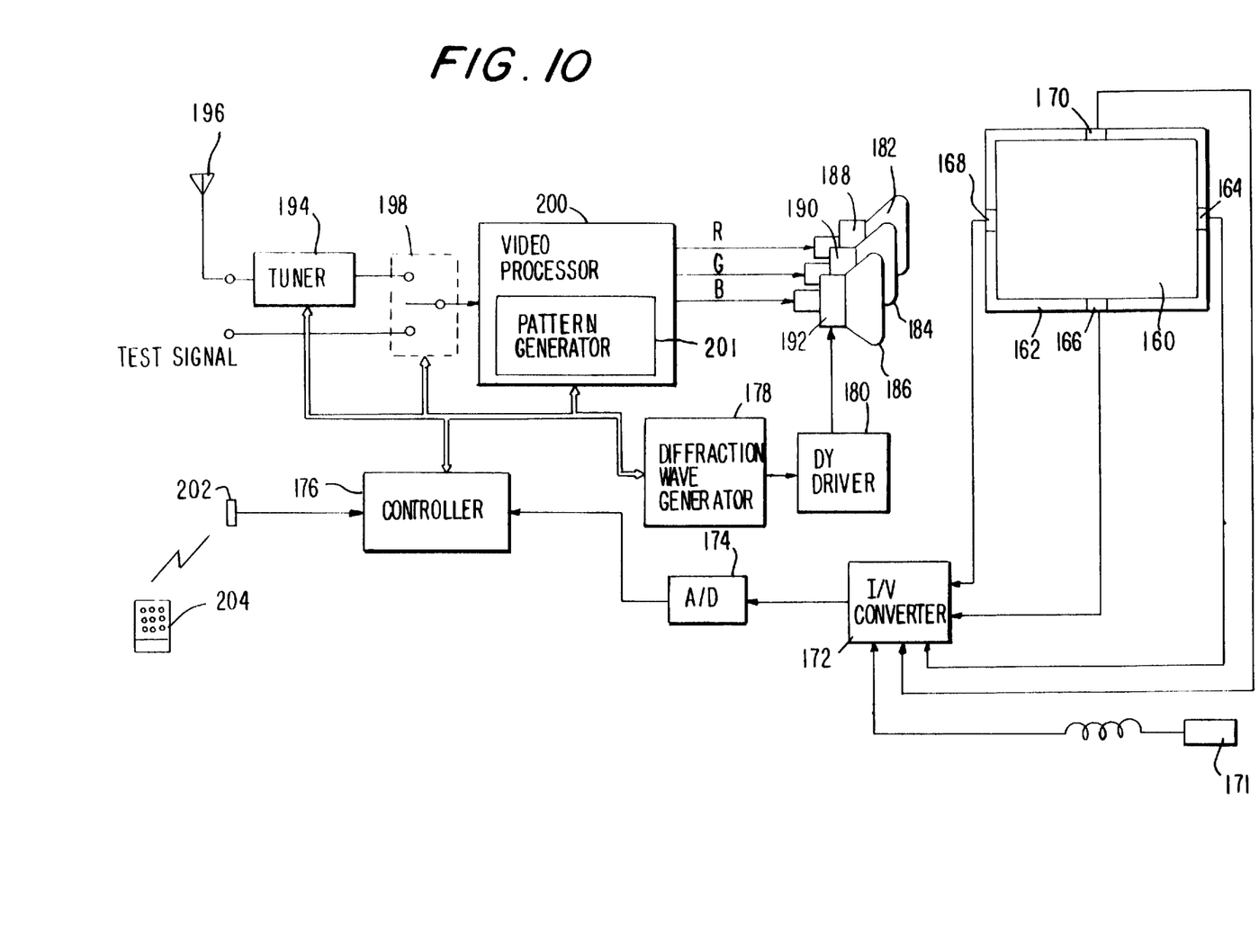
FIG. 10 is a schematic diagram of a television system according to the invention.

A schematic diagram of a television system suitable for implementing the present invention is shown in FIG. 10. The system includes a television screen 160 and three CRTs 182, 184 and 186 for forming images on the screen. Each CRT emits a beam of monochromatic light in one of the primary colors (red, blue and green), and each includes a deflection yoke 188, 190 and 192, respectively. Control of the CRTs for the purpose of forming images on the screen is performed by a video processor 200, which includes a pattern generator 201 for the purpose of forming the convergence test patterns. Convergence adjustment of the CRTs is controlled through a deflection yoke driver 180. Since the invention concerns convergence operations, the convergence portion of the system will be emphasized.

The system includes four peripheral convergence photo-sensors 164, 166, 168 and 170, and an external convergence sensor 171. The peripheral sensors are located behind a screen frame 162, while the external sensor is located external to the cabinet for placement on the outer surface of the screen. The sensors generate analog current signals which are passed to a current to voltage converter 172. The current to voltage regulator converts the current signals to analog voltage signals and relays the voltage signals to an A/D converter 174. The A/D converter receives the analog voltage signals, converts them to digital voltage signals, and passes the digital voltage signals to a controller 176. The controller then uses the digital voltage signals to perform the convergence calculations and determine the amount of any necessary beam alignment corrections. If correction is required, the controller sends appropriate correction signals to a diffraction wave generator 178. The correction signals received by the diffraction wave generator are converted into driver signals which are, in turn, passed to the diffraction yoke driver. The driver then generates one or more deflection yoke control signals and applies them to the CRT deflection yokes. Through repeated beam adjustment by way of the deflection yokes, proper beam alignment is maintained.

In addition to the above-identified elements, the television system of FIG. 10 includes a tuner 194, an antenna 196, a switch 198, and an infrared receiver 202. The tuner is used for receiving television signals, such as broadcast signals, through the antenna. These signals are coupled to the video processor by switch 198. However, the switch may deselect the tuner in favor of a test signal for purposes of testing the system. Infrared receiver 202 is provided to allow for remote control of the system via remote control unit 204.

While the present invention has been particularly shown and described in conjunction with preferred embodiments thereof, it will be readily appreciated by those of ordinary skill in the art that various changes may be made without departing from the spirit and scope of the invention. For example, more than one external sensor may be used. Furthermore, the number of periphery sensors employed is not required to be four. Any number of periphery sensors may be employed with the invention, or alternatively, no periphery sensors need be employed.

Also, rather than employing a grid of predetermined grid positions, an automatic position determining apparatus may be included within the display so that the user may perform convergence testing about any point in the continuum of points that make up the viewable area.

Figure 11:
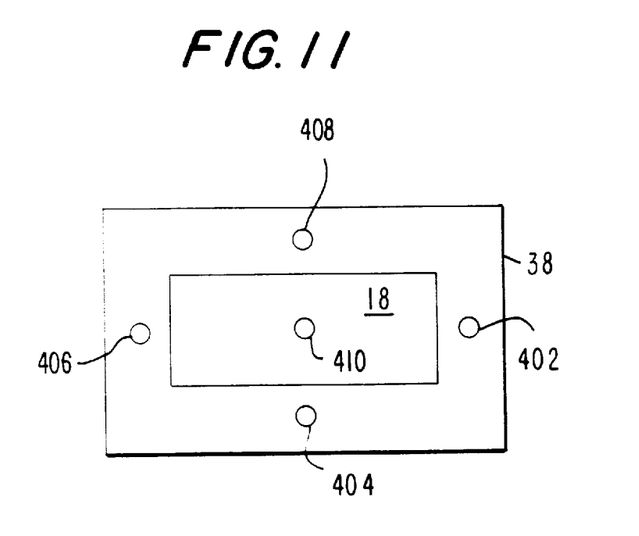
FIG. 11 shows the relationship between sensors, display screen, and scannable area for an alternative sensor arrangement in accordance with the invention.

Moreover, the external sensor(s) may be used in conjunction with one or more fixed internal sensors located within the viewable area. For example, the arrangement of sensors depicted in FIG. 11 may be used in conjunction with an external sensor. In the FIG. 11 arrangement, five sensors are employed, 402–410, sensor 410 being located at the center of the screen. That is, although the invention provides for convergence testing about points within the viewable area without the use of fixed sensors within the viewable area, it is possible to employ the invention in a system that includes fixed sensors within the viewable area.

In addition, the invention is applicable to many types of video displays and is not limited to rear projection television sets. For example, the invention may be employed in computer system monitors.

Therefore, it is intended that the appended claims be interpreted as including the embodiments described herein, the alternatives mentioned above, and all equivalents thereto.

What is claimed is:

1. Apparatus for performing convergence calibration in a system that uses multiple beams to generate a video display on a screen, comprising:

a photo sensor that is placed at a location within the viewable area of the screen for purposes of convergence calibration, and that may be removed for purposes of normal viewing of the display;

means for generating a first test pattern, said first test pattern located so as to partially overlap with said sensor, thereby defining a first covered area for said sensor, the portion of said sensor that is not overlapped defining a first uncovered area;

means for generating a second test pattern, said second test pattern located so as to overlap with said first uncovered area of said sensor, the portion of said sensor that is not overlapped by said second test pattern being said first covered area;

wherein for each beam, a first output is generated by said sensor when said first test pattern is generated, and a second output is generated by said sensor when said second test pattern is generated; and means for determining alignment of said beams on the basis of said first output and said second output.

2. Apparatus for performing convergence calibration in a system that uses multiple beams to generate a video display on a screen, comprising:

a photo sensor placed at a location within the viewable area of the screen for purposes of convergence calibration, and removable for purposes of normal viewing of the display;

means for generating a first test pattern, said first test pattern located so as to partially overlap with said sensor, thereby defining a first covered area for said sensor, the portion of said sensor that is not overlapped defining a first uncovered area;

means for generating a second test pattern, said second test pattern located so as to overlap with said first uncovered area of said sensor, the portion of said sensor that is not overlapped by said second test pattern being said first covered area;

wherein for each beam, a first output is generated by said sensor when said first test pattern is generated, a second output is generated by said sensor when said second test pattern is generated, and a no pattern output is generated by said sensor when no test pattern is generated; and means for determining alignment of said beams on the basis of said first output, said second output, and said no pattern output.

3. A method for performing convergence calibration in a system that uses multiple beams to generate a video display on a screen, comprising the steps of:

placing a photo sensor at a location within the viewable area of the screen for purposes of convergence calibration, said photo sensor being removable for purposes of normal viewing of the display;

generating a first test pattern, said first test pattern located so as to partially overlap with said sensor, thereby defining a first covered area for said sensor, the portion of said sensor that is not overlapped defining a first uncovered area;

generating a second test pattern, said second test pattern located so as to overlap with said first uncovered area of said sensor, the portion of said sensor that is not overlapped by said second test pattern being said first covered area;

wherein for each beam, a first output is generated by said sensor when said first test pattern is generated, and a second output is generated by said sensor when said second test pattern is generated; and determining alignment of said beams on the basis of said first output and said second output.

4. The method according to claim 3, further comprising the step of generating a no pattern output for said sensor, and wherein said alignment of said beams is determined on the basis of said first output, said second output, and said no pattern output.

* * * * *